US008102261B2

(12) United States Patent
Wu

(10) Patent No.: US 8,102,261 B2
(45) Date of Patent: Jan. 24, 2012

(54) MICROWAVE RANGING SENSOR

(75) Inventor: XiaoDong Wu, Roseville, CA (US)

(73) Assignee: Honeywell International Inc., Morristown, NJ (US)

(*) Notice: Subject to any disclaimer, the term of this patent is extended or adjusted under 35 U.S.C. 154(b) by 752 days.

(21) Appl. No.: 12/174,807

(22) Filed: Jul. 17, 2008

(65) Prior Publication Data
US 2010/0013636 A1    Jan. 21, 2010

(51) Int. Cl.
G08B 13/18    (2006.01)

(52) U.S. Cl. ...... 340/554; 340/6.1; 340/541; 340/545.2; 342/28; 342/53

(58) Field of Classification Search ............... 340/572.1, 340/10.3, 554, 565, 517, 521, 522, 552, 567, 340/545.2, 545.3, 581, 584, 523; 342/27, 342/28, 127, 157, 194, 357.26, 357.27, 357.37, 342/357.38, 442
See application file for complete search history.

(56) References Cited

U.S. PATENT DOCUMENTS

| 3,132,340 | A | * | 5/1964 | Galejs | 342/129 |
| 3,750,172 | A | * | 7/1973 | Tresselt | 342/129 |
| 4,286,260 | A | * | 8/1981 | Gershberg et al. | 340/554 |
| 4,937,583 | A | * | 6/1990 | Poinsard | 342/195 |
| 5,517,429 | A | * | 5/1996 | Harrison | 342/378 |
| 5,543,778 | A | * | 8/1996 | Stouffer | 340/539.14 |
| 5,923,284 | A | | 7/1999 | Artis et al. | |
| 6,188,318 | B1 | * | 2/2001 | Katz et al. | 340/545.3 |
| 6,380,882 | B1 | | 4/2002 | Hegnauer | |
| 6,639,545 | B1 | * | 10/2003 | Hager et al. | 342/107 |
| 6,677,887 | B2 | | 1/2004 | Harman | |
| 6,703,967 | B1 | | 3/2004 | Kuroda et al. | |
| 7,079,029 | B2 | | 7/2006 | Tsuji | |
| 7,079,030 | B2 | | 7/2006 | Tsuji | |
| 7,119,737 | B2 | | 10/2006 | Tsuji | |
| 2006/0284757 | A1 | | 12/2006 | Zemany | |
| 2008/0218340 | A1 | * | 9/2008 | Royer | 340/567 |

FOREIGN PATENT DOCUMENTS

| EP | 0933648 A1 | 8/1999 |
| EP | 2042886 A2 | 4/2009 |
| JP | 59116073 | 4/1984 |

OTHER PUBLICATIONS

Partial EPO Search Report, EP09165104.2, Feb. 8, 2010.

* cited by examiner

Primary Examiner — Daniel Wu
Assistant Examiner — Frederick Ott
(74) Attorney, Agent, or Firm — Barkume & Associates, P.C.

(57) ABSTRACT

A method for detecting an intruder in a protected space that uses a microwave frequency sensor to determine an accurate distance measurement to the intruder. The accurate distance measurement reduces the false alarms typically associated with microwave frequency sensors due to motion outside the protected space and vibration within the protected space. The motion detector transmits three microwave frequency signals of different frequencies in order to eliminate an ambiguity problem when determining the accurate distance measurement. The accuracy of the intruder distance measurement may be determined with greater resolution by reiteratively transmitting and evaluating microwave frequency signals of different frequencies. The motion detector of the present invention may include a PIR sensor. The accurate distance measurement allows the motion detector to precisely set signal threshold levels for the microwave frequency detector and the passive infrared detector to reliably detect an intruder while discriminating against an animal or other moving object.

4 Claims, 3 Drawing Sheets

MICROWAVE RANGING SENSOR

TECHNICAL FIELD

The present invention relates to security systems, and in particular to microwave frequency motion detectors used for monitoring a protected space.

BACKGROUND ART

In the security field, duel technology motion detectors consisting of a Doppler microwave frequency (MW) detector and a passive infrared (PIR) detector are used to more accurately determine if an intruder has entered a protected space. The PIR detector senses infrared radiation (IR) from the intruder while the MW detector transmits a MW signal and receives a reflected MW signal from the intruder in the field. The typical operation of a dual technology motion detector is that the sensor will generate an alarm signal when the PIR detector and the MW detector both detect the intruder. The combination of the detectors eliminates the false alarm such as wall vibration while increasing the reliability. However, the combination of the detectors does not improve detection of an intruder when the intruder is cloaked, moves down the throat (directly at the detector), or is in a high ambient temperature. These situations are inherent weaknesses of the PIR detector.

It is desirable to produce a dual technology detector without the inherent weaknesses of the PIR detector and without the false alarms of the MW detector. This may be accomplished by using a reliable MW detector to generate an alarm signal without confirmation by the PIR detector. One way to achieve a reliable MW detector is to accurately determine the distance and movement of the target. This allows the detector to discriminate small moving objects close to the sensors that are too small to be intruders while reliably detecting an intruder at the back of the room. An accurate distance measurement also allows movement outside the protected space to be ignored and vibration of objects within the protected space to be discriminated against, thereby eliminating the MW detector's tendency to false alarm.

In addition, it is desirable to have a motion detector with greater pet immunity. When a household contains a pet, the PIR sensor's field of view is limited so it does not include the area near the floor, and therefore does not sense IR from a pet. However, a pet may trigger a false alarm when it is moving at the back of the room because the PIR sensor's field of view is cone shaped and at further distances senses IR closer to the floor. Accurate distance information would help distinguish this situation.

Unfortunately, the common Doppler MW motion sensors don't have the ability to measure target distance. A less expensive method of transmitting two different frequency MW signals and determining the phase difference between the two detected Doppler signals may be used to determine the distance, however, an ambiguity arises from a phase advance/delay uncertainty between the two signals.

It is object of the present invention to increase a dual technology detector's ability to detect an intruder.

It is a further object of the present invention to have a dual technology detector without the inherent weaknesses of the PIR motion detector.

It is a further object of the present invention to produce a MW motion detector that is not sensitive to false alarms.

It is a further object of the present invention to have a MW motion detector that accurately determines the distance of an object without ambiguity.

Finally, it is a further object of the present invention to have a detector with greater pet immunity.

DISCLOSURE OF THE INVENTION

The present invention is a method and a motion detector for detecting an intruder in a protected space that uses a MW sensor to determine an accurate distance measurement to the intruder without an ambiguity problem. The accurate distance measurement reduces the false alarms typically associated with MW motion detectors due to motion outside the protected space and vibration within the protected space. It also allows the motion detector to precisely set signal threshold levels to reliably detect an intruder while discriminating against an animal or other moving object.

The method includes the steps of transmitting three MW signals one at each of three different frequencies ($F1$, $F2$, $F3$), receiving reflected signals from an intruder in the protected space corresponding to each of the three different frequencies, generating three intermediate frequency (IF) signal components ($IF1$, $IF2$, $IF3$) from the reflected MW signals, determining a phase angle associated with each of the IF signal components ($ø1$, $ø2$, $ø3$), determining a first phase difference from $ø1$ minus $ø2$ and a second phase difference from $ø1$ minus $ø3$, determining from each of the first and second phase differences a true and an ambiguous distance measurement, and selecting an accurate distance measurement by matching the common true distance measurements. The method may also be accomplished by transmitting more than three microwave frequency signals of different frequencies, and matching the common true distance measurement. The phase angle is determined using a Fast Fourier Transfer (FFT) algorithm but many be accomplished by other means known in the art. Each of the first and second phase differences gives rise to two distance measurements due to the uncertainty of whether the phase angle of $IF1$ leads or lags the phase angle of $IF2$ and $IF3$. Therefore, four distance measurements will result, two will be the same and two will be different. The two distance measurements that are the same are the accurate distance measurements and the two different distance measurements are the ambiguous ones.

The method further includes the steps of determining an amplitude for each IF signal component; selecting a signal level based on the amplitudes, which may be an average of the three amplitudes or may be the highest amplitude of the three amplitudes; reading a stored predetermined threshold that corresponds to the accurate distance measurement; and if the signal level is greater than the predetermined threshold, generating one or more warning signals signifying motion has been detected. The predetermined threshold levels are calculated from empirical data taken from studies of signals received from humans, pets and other objects. The stored thresholds are selected so that reflected signals from humans are above the threshold while reflected signals from pets and other objects are below the threshold. The significance of the present invention is that the accuracy of the distance measurement of the intruder and the comprehensiveness of the threshold table allows the threshold to be precisely selected to eliminate false alarms and to accurately transmit an alarm signal when an intruder is in the protected space.

The motion detector of the present invention includes a MW transmitter for transmitting the three MW signals of different frequencies, a MW receiver that receives the reflected signals from an intruder moving in the protected space, a MW circuit that supplies the IF signal components that correspond to the reflected MW signals, data collection circuits that are configured to sample the IF signal components, and processor circuitry. The processor circuitry is operatively coupled to the MW transmitter to provide a frequency control signal and operatively coupled to the data collection circuits to provide enabling signals for the collection of data samples from the IF signal components. The motion detector may also include memory for storing the table of predetermined thresholds that correspond to the accurate distance measurements, for example, a threshold for every few feet. The processor circuitry determines the accurate distance measurement by evaluating the collected data. The motion detector may also include an alarm circuit for transmitting an alarm signal when the signal level of the collected data is above the predetermined threshold level.

The frequency control signal generated by the processor circuitry causes the microwave transmitter to transmit a sequence of three different frequency MW signals at a periodic rate. The rate can be constant or variable. Alternatively, an oscillator enable signal may be generated by the processor circuitry which enables a dedicated oscillator control circuit to generate the frequency control signal that causes the microwave transmitter to transmit the three MW signals. In this embodiment, the oscillator control signal has a predetermined duty cycle and the voltage level of the frequency control signal determines the frequency of each of the three transmitted microwave frequency signals. Since the signals are transmitted at close time intervals, there is little error introduced into the phase difference measured. The control circuit that generates the required waveform is well known in the art. It can be a stand alone circuit or a part of a processor.

Furthermore, the microwave circuit generates the IF signal components by combining a portion of the MW signal (at the transmitted F1, F2, or F3) with the received reflected MW signal. As the IF signal components are generated they are multiplexed onto an IF signal that is operatively connected to the data collection circuits. The data collection circuits include three detection channels (one for each frequency). The channels are sequentially enabled by the processor circuitry to match the sequential transmission of the three MW signals. The three parallel detection channels allow the three MW signals to be transmitted and received at almost the same time. Each detection channel consists of a switch circuit to provide the IF signal to the detection channel when the detection channel is enabled by the processor circuitry, a sample-and-hold circuit coupled to receive the IF signal from the switch circuit, an amplifier circuit coupled to receive the sampled IF signal, and an analog-to-digital converter circuit coupled to receive the amplified sampled IF signal and supply a digital data sample of the IF signal. The processor circuitry sequentially collects a data sample for each of the three MW signals transmitted for a predetermined number of times to generate three IF data sets. Each IF data set is then processed using an FFT algorithm to produce three phase angles, and signal strength. An automatic gain control circuit (AGC) can be used instead of the amplifier circuit.

In another embodiment of the present invention, the accuracy of the intruder distance measurement may be determined with greater resolution by reiteratively evaluating collected data sets. The method may include the steps of determining if the intruder is approximately at the maximum distance, and if the intruder is not approximately at the maximum distance, selecting a new second and third frequency based on the determined accurate distance and completing the steps to determine the accurate distance measurement again with the newly selected frequencies. A greater distance resolution is achieved with each distance calculation iteration because the dynamic range of the detector must initially cover the maximum distance of the protected space to make sure an intruder anywhere in the room is detected, and once the distance of the intruder is determined to be less than the maximum distance, the detector's dynamic range only needs to cover the determined distance. As the distance gets smaller, the resolution gets better. The maximum distance of each reiteration is inverse proportional to the difference between the frequencies of the transmitted MW signals. The method of the present invention adjusts the frequency difference by holding F1 constant and changing F2 and F3 based on the distance calculated. The difference between F1 and F2 and between F1 and F3 is very small compared to F1.

The method may also include the steps of determining the direction of the intruder movement from each of the three intermediate frequency signal components, determining if the intruder is approximately at the maximum distance, and if the intruder is approximately at the maximum distance and the intruder direction is moving away, then not generating a warning signal, or disregarding the detected motion. The direction of the intruder movement may be determined from the sign of the phase differences.

In addition the motion detector of the present invention may include a PIR sensor as a dual technology motion detector. The motion detector includes an alarm circuit for transmitting an alarm signal, and data collection circuits for sampling the PIR sensor output. The processor circuitry processes the collected data and determines whether the output signal of the PIR sensor is above a PIR threshold, and in one embodiment, if it is and motion has been detected by the MW sensor, the processing circuitry will cause the alarm circuits to transmit an alarm signal. In this embodiment, a warning signal is produced when the MW sensor detects motion and an alarm is only transmitted when the PIR sensor output is above the PIR threshold. In a different embodiment, the PIR threshold may be a stored predetermined threshold that is correlated to the accurate distance measurement and when the output of the PIR detector is above the PIR threshold the processing circuitry will cause the alarm circuits to transmit an alarm signal. In this embodiment the MW sensor is used to determine the distance measurement to the motion and to precisely select the PIR threshold level only. In another embodiment, if motion has been detected by the MW sensor within the protected area, but the output of the PIR sensor is not above the PIR threshold, the processing circuitry may determine if the ambient room temperature is close to a temperature threshold (Human body temperature), and if it is, the processing circuitry may transmit an alarm signal without confirmation of the intruder by the PIR detector. Similarly, if motion has been detected by the MW sensor, but the output of the PIR detector is not above the PIR threshold, the processing circuitry may determine if the motion of the intruder is directly at the PIR sensor (by distance and moving direction) (also known as down the throat motion), and if it is and the accurate distance is less than a predetermined distance value, the processing circuitry may transmit an alarm signal without confirmation of the intruder by the PIR detector.

BEST MODE FOR CARRYING OUT THE INVENTION

Figure 1:
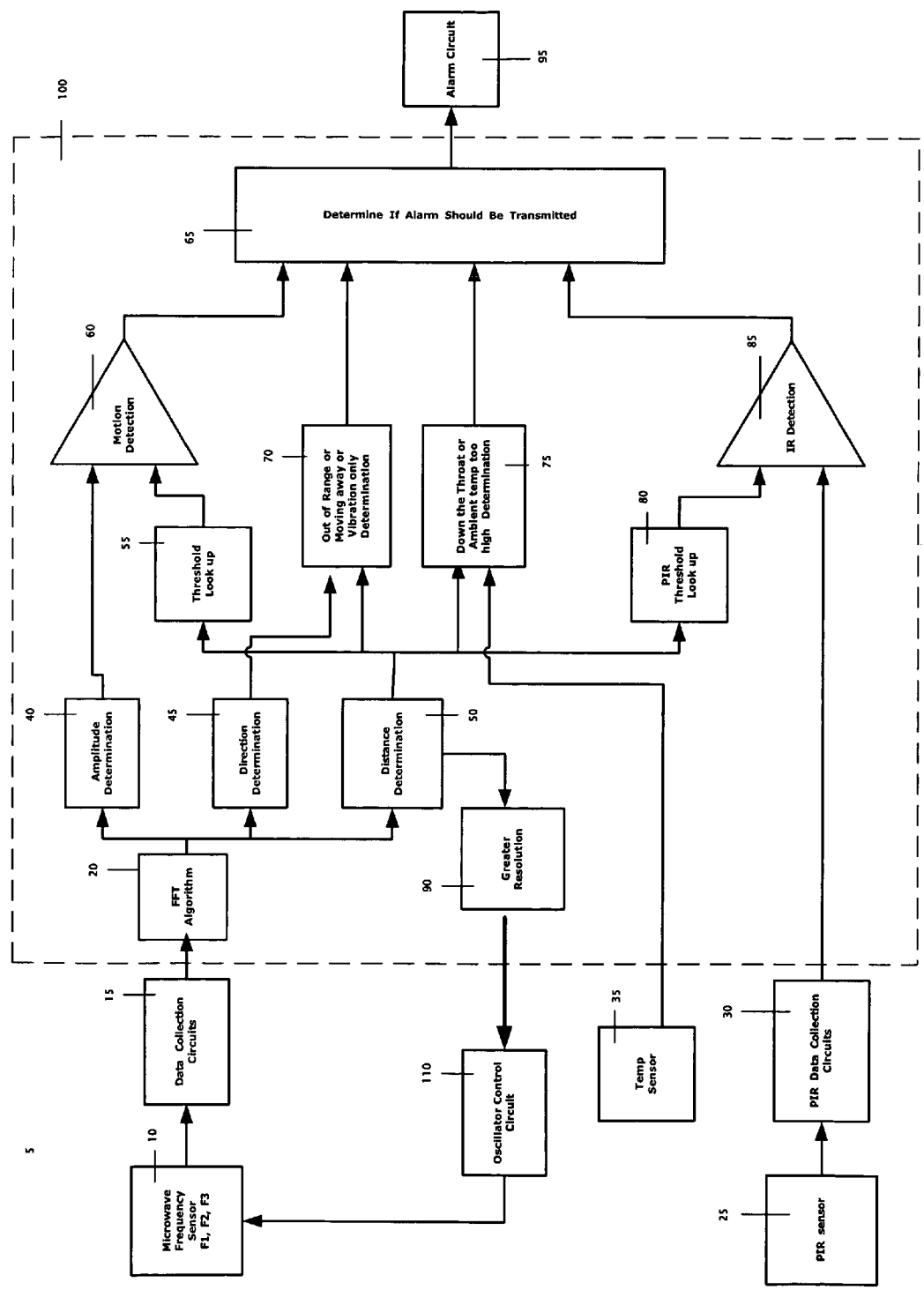
FIG. 1 is an illustration of the implementation of the preferred embodiment of the present invention.

FIG. 1 is an illustration of the components and the processes that the motion detector 5 of the present invention uses to determine whether an intruder is present in a protected space. The components are the MW sensor 10, the data collection circuits 15, the PIR sensor 25, the PIR data collection circuits 30, the oscillator control circuit 110, the temperature sensor 35, the processor circuitry 100, and the alarm circuit 95. The oscillator control circuit 110, further described below, causes the MW sensor 10 to transmit three MW signals (F1, F2, and F3) that differ only slightly so that F2=F1+Δ1 and F3=F1+Δ2, where Δ1<<F1 and Δ2<<F1. In the preferred embodiment, the frequencies of the transmitted MW signals are initially set to cover the Maximum distance (minimum frequency difference such as few MHz). The MW sensor contains a MW receiver that receives reflected MW signals from a moving object in the protected space. The protected space is nominally a 35 ft room, but may be as large as a 200 ft room. The received signals are sampled by the data collection circuits 15, as described below. After the received signals are sampled, the samples are collected by the processor circuitry 100. At approximately the same time, signals from the PIR sensor 25 are sampled by PIR data collection circuits 30 and collected by the processor circuitry 100. The PIR sensor 25 and PIR data collection circuits 30 are well known in the art and will not be described further. In addition to the MW sensor 10 and the PIR sensor 25 data samples the processor circuitry 100 receives the ambient temperature from the temperature sensor 35.

The processing by the processor circuitry 100 will now be described. The processor circuitry 100 sequentially collects the data samples into three data sets of the IF signal samples where the data sets correspond to each of the three MW signals (F1, F2, and F3). Each data set is processed using an FFT algorithm 20 to determine the signal amplitude and phase angle (ø1, ø2, ø3) of the received reflected Doppler signals as known in the art. First the distance to the moving object is determined 50 by finding two phase differences, Δø1 and Δø2, by subtracting the phase angles, ø1−ø2 and ø1−ø3, respectively. For each phase difference, two distances are determined, R and R', where one is a true distance measurement and the other is an ambiguous distance measurement. The ambiguous distance measurement is due to the phase advance/delay uncertainty between the received Doppler signals. The two distances are determined using the equations:

$$R = c|\Delta\o|/4\pi\Delta f$$

and $$R' = c|2\pi - \Delta\o|/4\pi\Delta f,$$

where R and R' are the distances to the moving object in meters from the microwave sensor, c is the speed of light in meters per second, Δf is F2−F1 or F3−F1 in Hz, and |Δø| is the absolute value of Δø1 or Δø2 respectively in radians. To determine the accurate distance measurement, the four distances are compared. The two that are different are the ambiguous distance measurements, while the two true distance measurements that are approximately the same and are selected as the accurate distance measurement.

The accurate distance measurement is used in a number of ways. First, it is checked for out of range 70, which occurs when the moving object is outside the protected space. If it is out of range 70, the processor circuitry 100 does not allow an alarm to be transmitted 65. Next the direction of travel is determined 45 from the sign (+/−) of Δø1 or Δø2 by time gated the phase difference. The + sign indicates an approaching target while the − sign indicates a leaving target. If the accurate distance is approximately at the maximum distance of the protected space and the direction of travel 45 is away from the detector 5, the processor circuitry 100 determines the motion is moving away 70. This condition will also cause the processor circuitry 100 not to transmit an alarm 65. In addition, the accurate distance measurement is used to check for vibration of an object rather than motion by an intruder.

If the distance measurement is less than the maximum range of the MW sensor 10, the processor circuitry 100 can performs another iteration of data collection with greater resolution 90 (option). In order to achieve greater resolution 90, a new F2 and F3 are selected based on the accurate distance measurement. This is accomplished in the present invention by holding F1 constant and selecting a new F2 and F3 so that Δf at least covers the accurate distance measurement. F2 and F3 are selected close to F=F1+c/2R", R" is the previous detected distance. The resolution is greater because the maximum unambiguity distance is reduced while the phase measurement error for the system is the same. Multiple ambiguities do not arise at this point because the distance is already known (although with less resolution).

Once the best resolution has been achieved at that distance, the accurate distance measurement is used as a pointer to a threshold level in a threshold look up table 55 stored in memory. The threshold levels are programmed during manufacture and have been selected based on empirical test results. The thresholds are selected so that signal amplitudes from humans at each accurate distance measurement will be above the threshold while signal amplitudes that are not from humans will not be above the threshold. For example, the thresholds can be set up for every few feet. Once the threshold 55 is determined, the amplitude is determined 40 by finding an average of the three signal amplitudes, or alternatively from selecting the highest signal amplitude. The amplitude is compared to the threshold signal level 60 and if the amplitude is greater, then motion has been detected 60.

In a similar manner, the accurate distance measurement is used as a pointer to a threshold level in a PIR threshold look up table 80 stored in memory. The threshold levels are also programmed during manufacture and have been selected based on empirical test results. The thresholds are also selected so that the IR signal amplitudes from humans at each accurate distance measurement will be above the threshold while IR signal amplitudes that are not from humans will not be above the threshold. The ability to know the distance of the heat source (the IR generator) greatly helps in a pet immunity mode because the threshold level can be accurately set so that a pet at different locations in the protected space will not generate an alarm. The PIR signal from the PIR data collection circuits 30 is compared to the PIR threshold level 80 and if the PIR signal is above the PIR threshold, then the PIR sensor 25 has detected IR from an intruder 85.

Usually when there is an intruder in the protected space, both the MW sensor 10 will detect motion 60 from the intruder and the PIR sensor 25 will detect IR 85 from the intruder at the same time and processor circuitry 100 will determine that an alarm should be transmitted 65. The alarm circuit 75 will be enabled by the processor circuitry 100 to transmit an alarm, as known in the art. If the PIR sensor 25 does not detect IR 85, then the detection of motion 60 may be considered a warning signal. When a warning signal is present, the processor circuitry 100 checks if the ambient temperature is close to the human body temperature, the intruder is walking directly at the PIR sensor 25 (down the throat motion), or the intruder is cloaked. When the ambient temperature is close to human body temperature as determined from the temp sensor 35, the processor circuitry 100 determines to transmit an alarm 65 when motion has been detected 60 that is not out of range, moving away, or only a vibration 70. When the ambient temperature is not close to human body temperature, the processor circuitry 100 determines to transmit an alarm 65 when motion has been detected 60 that is not out of range, moving away, or only a vibration 70. The problem for detecting a cloaked intruder or down the throat motion 75 is overcome.

Figure 2:
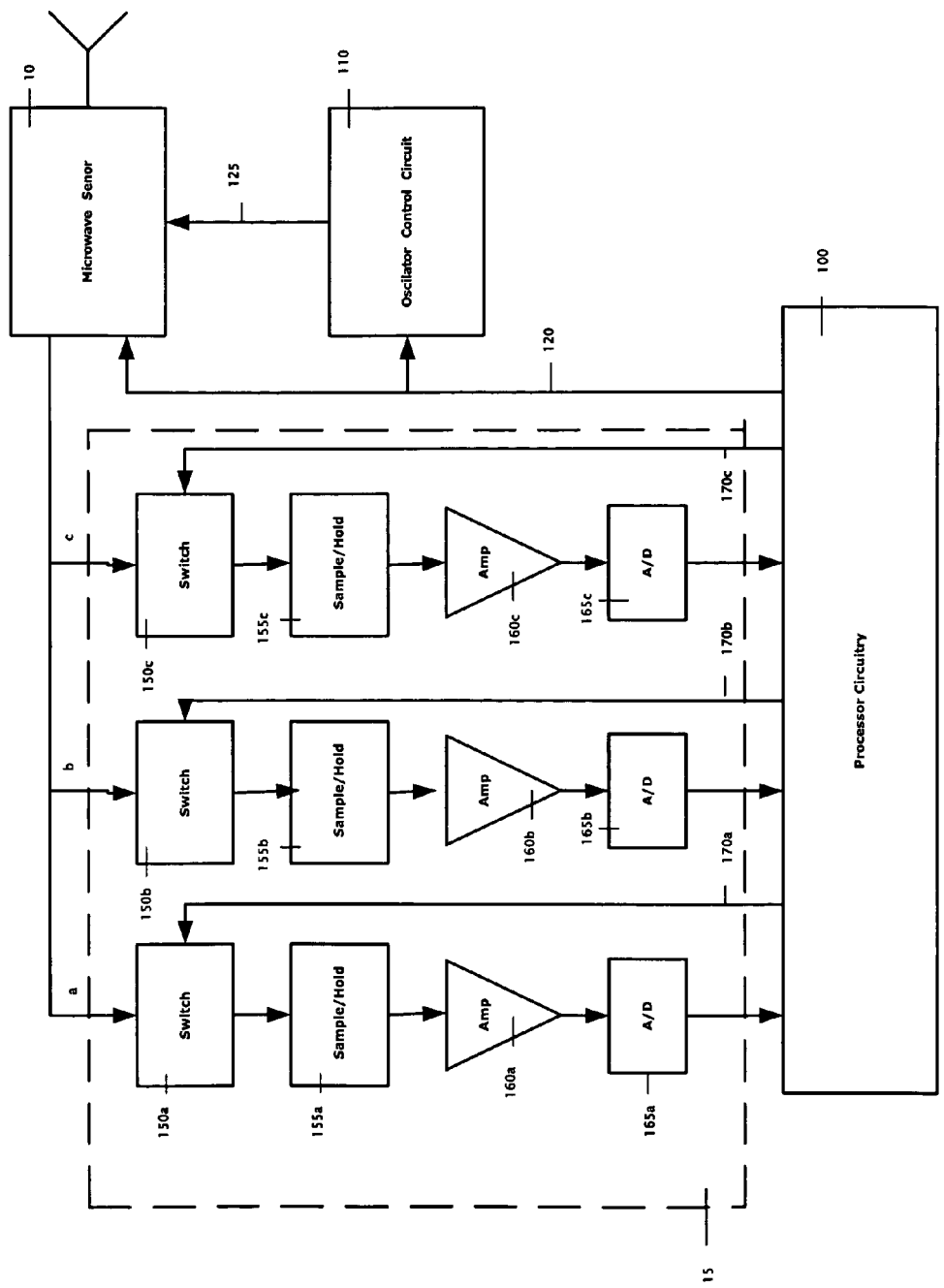
FIG. 2 is a block diagram showing the data collection circuits for the microwave sensor.

FIG. 2 shows a block diagram of the data collection circuits 15. In this embodiment the processor circuitry 100 enables the oscillator control circuit 110, which is described in further detail below, to generate a frequency control signal. It is also possible in a different embodiment that the processor circuitry 100 generates the frequency control signal. The frequency control signal causes the MW sensor 10 to transmit and receive MW signals at three different frequencies, F1, F2, and F3. The MW sensor 10 converts the received MW signals to IF signal component by mixing a portion of the MW signal (at the transmitted F1, F2, or F3) with the received reflected MW signal as known in the art. The IF signal components are sequentially transferred to three parallel data channels, a, b, c. The parallel data channels a-c each have a switch 150a-c that is enabled by the processor circuitry 100 to allow the IF signal to be connected to a sample and hold circuit 155a-c. The signal from the sample and hold circuit 155a-c is amplified by a bandpass amplifier 160a-c and converted to a digital sample by an A/D converter 165a-c. The data sample from the A/D converter 165a-c are transferred to the processing circuitry 100. The amplifier circuit can be replaced by an automatic gain control.

Figure 3:
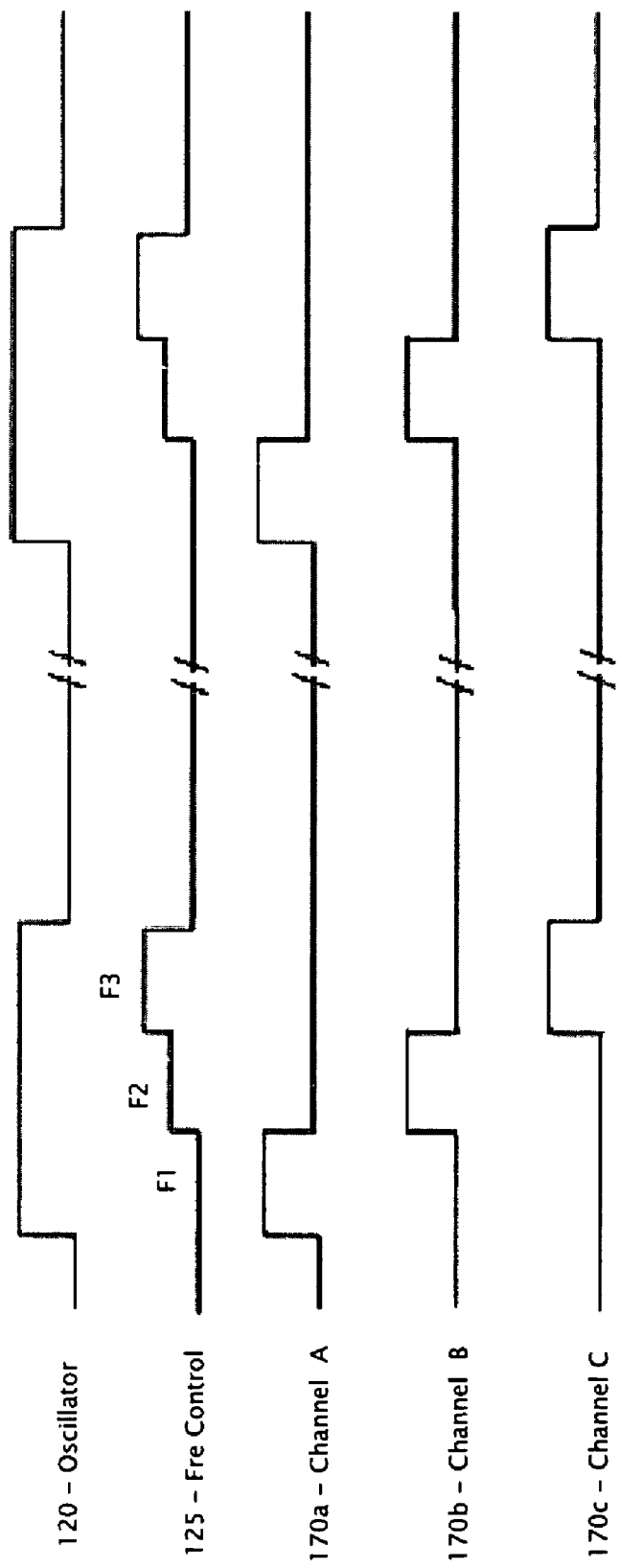
FIG. 3 is a timing diagram showing the control signals for the data collecting circuits for the microwave sensor.

FIG. 3 shows a timing diagram of the control signals from the processor circuitry 100. The data collection starts when the oscillator control circuit 110 is enabled by the Oscillator enable signal 120 from the processor circuitry 100. The frequency control signal 125, which is generated by the oscillator control circuit 110, has a variable voltage range. The frequency control signal 125 contains, for example, three voltage steps that correspond to the selected frequencies of F1, F2, and F3. Since F1 is held constant, the voltage corresponding to F1 is always the same. The voltages of F2 and F3 vary depending on the resolution. As shown, the switch enable signals 170a-c for selecting switch 150a, b, and c correspond to the voltage steps for F1, F2, and F3 respectively. These control signals cause data sample collection to proceed in the following manner: the MW sensor 10 transmits, receives and converts to IF a MW signal at frequency F1; the IF signal component is transmitted to switch 150a; and the sample-and-hold circuit 155a samples it. While data channel a is amplifying and converting the F1 sample to a digital format, the frequency control signal 125 changes voltage level to correspond to frequency F2. This causes the MW sensor 10 to transmit, receive and convert to IF a MW signal at frequency F2. The IF signal component is transmitted to switch 150b and the sample-and hold circuit 155b samples it. While data channel b is amplifying and converting the F2 sample to a digital format, the frequency control signal 125 changes voltage level to correspond to frequency F3. This causes the MW sensor 10 to transmit, receive and convert to IF a MW signal at frequency F3. The IF signal component is transmitted to switch 150c and the sample-and hold circuit 155c samples it. Data channel c amplifies and coverts the F3 sample to a digital format while the oscillator enable signal 120 is disabled. The data samples from all three data channels are stored then stored by the processor circuitry 100. This sequence takes place at a periodic rate of, for example, two hundred microsecond. After the data samples are collected for each IF1, IF2, and IF3, the processing described above is performed.

The preferred embodiment of the present invention has been described, but one skilled in the art will recognize that variations to the preferred embodiment may be made while still being within the scope of the present invention. For instance, more than three MW signals of different frequencies may be transmitted and processed by the detector 5 of the present invention. The determination if an alarm should be transmitted 65 may incorporate detection of motion from multiple MW sensors, detection of IR from multiple PIR sensors, or information from other sources such as the time of day. The processing may take place in a different order or may be accomplished by dedicated hardware components. Likewise, the data collection circuits 15 and the oscillator control circuit 110 may be accomplished using different components. Finally the function of the oscillator control circuit may be performed directly by the processor circuitry 100.

I claim:

1. A method of detecting an intruder in a protected space using a Doppler motion detector comprising the steps of:
   transmitting three microwave frequency signals of different frequencies,
   receiving reflected microwave signals, wherein each reflected microwave signal corresponds to one of the three transmitted microwave frequency signals reflected by a moving intruder in the protected space,
   generating from the received microwave signals intermediate frequency signal components, wherein each intermediate frequency signal component is representative of one of the received reflected microwave signals,
   sampling the intermediate frequency signal components,
   determining a first, second, and third phase angle from the sampled intermediate frequency signal components,
   determining a first phase difference between the second phase angle and the first phase angle,
   determining a second phase difference between the third phase angle and the first phase angle,
   for each of the first and second phase differences, determining two corresponding distance measurements, wherein one distance measurement is a true distance measurement and the other distance measurement is an ambiguous distance measurement,
   selecting an accurate distance measurement by matching the common true distance measurement of each phase difference,
   after selecting the accurate distance measurement, determining if the intruder is approximately at a maximum distance, and
   if the intruder is not approximately at the maximum distance:
      selecting a new second and third frequency based on the accurate distance measurement previously determined, and
      completing the steps to determine an accurate distance measurement again with the newly selected frequencies.

2. A method of detecting an intruder in a protected space using a Doppler motion detector comprising the steps of:
   transmitting three microwave frequency signals of different frequencies,
   receiving reflected microwave signals, wherein each reflected microwave signal corresponds to one of the three transmitted microwave frequency signals reflected by a moving intruder in the protected space,
   generating from the received microwave signals intermediate frequency signal components, wherein each intermediate frequency signal component is representative of one of the received reflected microwave signals, sampling the intermediate frequency signal components,
determining a first, second, and third phase angle from it sampled intermediate frequency signal components,
determining a first phase difference between the second phase angle and the first phase angle,
determining a second phase difference between the third phase angle and the first phase angle,
for each of the first and second phase differences, determining two corresponding distance measurements, wherein one distance measurement is a true distance measurement and the other distance measurement is an ambiguous distance measurement,
selecting an accurate distance measurement by matching the common true distance measurement of each phase difference,
for each of the three intermediate frequency signal components, determining an amplitude,
selecting a signal level based on the three amplitudes,
reading a stored predetermined threshold that corresponds to the accurate distance measurement,
comparing the signal level to the stored predetermined threshold, and
if the signal level is above the stored predetermined threshold, generating one or more warning signals signifying motion has been detected,
sampling an output signal of a Passive Infra Red (PIR) detector, wherein the PIR detector senses infrared radiation from the moving intruder in the protected space,
determining whether the output signal of the PIR detector is above a PIP threshold, and
if the output signal of the PIR detector is above a predetermined threshold, and the motion has been detected, transmitting an alarm signal,
if motion has been detected but the output of the PIR detector is not above the PIR threshold, determining if an ambient room temperature is close to human body temperature, and
if the ambient room temperature is close to the human body temperature and the accurate distance is less than a predetermined distance value,
generating one or more warning signals.

3. A method of detecting an intruder in a protected space using a Doppler motion detector comprising the steps of:
transmitting three microwave frequency signals of different frequencies,
receiving reflected microwave signals, wherein each reflected microwave signal corresponds to one of the three transmitted microwave frequency signals reflected by a moving intruder in the protected space,
generating from the received microwave signals intermediate frequency signal components, wherein each intermediate frequency signal component is representative of one of the received reflected microwave signals,
sampling the intermediate frequency signal components,
determining a first, second, and third phase angle from the sampled intermediate frequency signal components,
determining a first phase difference between the second phase angle and the first phase angle,
determining a second phase difference between the third phase angle and the first phase angle,
for each of the first and second phase differences, determining two corresponding distance measurements, wherein one distance measurement is a true distance measurement and the other distance measurement is an ambiguous distance measurement,
selecting an accurate distance measurement by matching the common true distance measurement of each phase difference,
for each of the three intermediate frequency signal component, determining an amplitude,
selecting a signal level based on the three amplitudes,
reading a stored predetermined threshold that corresponds to the accurate distance measurement,
comparing the signal level to the stored predetermined threshold, and
if the signal level is above the stored predetermined threshold, generating one or more warning signals signifying motion has been detected,
sampling an output signal of a Passive Infra Red (PIR) detector, wherein the PIR detector senses infrared radiation from the moving intruder in the protected space,
determining whether the output signal of the PIR detector is above a PIR threshold, and
if the output signal of the PIR detector is above a predetermined threshold, and the motion has been detected, transmitting an alarm signal,
if motion has been detected but the output of the PIR detector is not above the PIR threshold, determining the direction of the intruder movement from each of the three intermediate frequency signal components, and
if the direction of the motion of the intruder is towards the detector and the accurate distance is less than a predetermined distance value, transmitting an alarm signal.

4. A motion detector for detecting motion from an intruder in a protected space comprising:
a microwave transmitter, wherein the microwave transmitter transmits at least three microwave signals of different frequencies,
a microwave receiver that receives reflected transmitted microwaves, wherein each reflected microwave signal corresponds to one of the three transmitted microwave frequency signals reflected by a moving intruder in the protected space,
a microwave circuit that supplies intermediate frequency signal components that correspond to the reflected signals,
data collection circuits that are configured to sample the intermediate frequency signal components, and
processor circuitry that is
operatively coupled to the microwave transmitter to provide a frequency control signal, wherein said microwave transmitter responds to said frequency control signal by generating and transmitting microwave frequency signals of three different frequencies; and
operatively coupled to the data collection circuits to provide enabling signals for the collection of data samples from the intermediate frequency signal components;
wherein the processor circuitry determines an accurate distance measurement by evaluating the collected data samples from the three different frequencies, and
wherein the evaluation of the collected data comprised the steps of:
determining a first, second, and third phase angle,
determining a first phase difference between the second phase angle and the first phase angle,
determining a second phase difference between the third phase angle and the first phase angle,
for each of the first and second phase difference, determining two corresponding distance measurements, wherein one distance measurement is a true distance measurement and the distance measurement is an ambiguous distance measurement, selecting the accurate distance measurement by matching the common true distance measurement of each phase angle, wherein the processor circuitry determines a more accurate distance measurement by reiteratively evaluating the collected data using updated frequencies that are selected based on the accurate distance measurement and wherein the accurate distance measurement is less than a maximum distance measurement.

* * * * *